United States Patent [19]

Percebois et al.

[11] Patent Number: 5,297,826
[45] Date of Patent: Mar. 29, 1994

[54] LOCKING JOINT FOR PIPE SYSTEMS

[75] Inventors: Alain Percebois; Andre Remy, both of Blenod les Pont-A-Mousson; Jean-Pierre Vitel, Thiaucourt-Regnieville, all of France

[73] Assignee: Pont-A-Mousson S.A., Nancy, France

[21] Appl. No.: 972,900

[22] Filed: Nov. 6, 1992

[30] Foreign Application Priority Data

Nov. 7, 1991 [FR] France .................... 91 13753

[51] Int. Cl.⁵ .................................... F16L 21/04
[52] U.S. Cl. .................... 285/232; 285/323; 285/339; 285/342; 285/374
[58] Field of Search ............ 285/337, 339, 323, 342, 285/343, 421, 374, 104, 232

[56] References Cited

U.S. PATENT DOCUMENTS

| | | | |
|---|---|---|---|
| 4,867,488 | 9/1989 | Jones | 285/323 |
| 5,037,144 | 8/1991 | Peting et al. | 285/323 X |
| 5,067,751 | 11/1991 | Walworth et al. | 285/232 X |
| 5,197,768 | 3/1993 | Conner | 285/374 X |
| 5,207,459 | 5/1993 | Glorer | 285/323 X |

FOREIGN PATENT DOCUMENTS

| | | | |
|---|---|---|---|
| 551254 | 1/1958 | Canada | 285/342 |
| 0175169 | of 1986 | European Pat. Off. | |
| 334380 | 9/1989 | European Pat. Off. | 285/337 |
| 0455490 | of 1992 | European Pat. Off. | |
| 1250214 | of 1967 | Fed. Rep. of Germany . | |
| 79111 | of 1962 | France . | |

*Primary Examiner*—Randolph A. Reese
*Assistant Examiner*—Heather Chun
*Attorney, Agent, or Firm*—Sughrue, Mion, Zinn, Macpeak and Seas

[57] ABSTRACT

A socket joint for ductile cast iron pipes is locked by toothed locking ring inserts 15 and a counter-flange 11. At least one elastic lip 19 is inserted between the locking ring and the rear face of a rigid stop ring which encloses the smooth or male end of the pipe 1.

9 Claims, 3 Drawing Sheets

LOCKING JOINT FOR PIPE SYSTEMS

BACKGROUND OF THE INVENTION

This invention concerns a joint locked in place between the smooth end of a first tubular element and the socket end of a second tubular element, of the type comprising a sealing gasket housed in the socket, a locking ring incorporating inner teeth surrounding the smooth end, and a counter-flange fitted with means for attachment to the socket and configured to implement position-retention of the locking ring preventing backward movement. The invention is especially applicable to the installation of systems of pipes made of ductile cast iron.

Whatever the type of gasket used, whether a radial compression gasket for joints termed "automatic", or an axial compression gasket for joints termed "mechanical", locked joints of this type must restrict the backward movement of the smooth pipe end to a very low value during pressurization of the pipe system, while being easy to use.

Furthermore, to ensure that the tubular joint can be locked in an effective, durable manner and to ensure that the life of the tubular elements or pipes is not affected, the areas of contact between the locking ring and the metal parts enclosing it should be protected against corrosion.

SUMMARY OF THE INVENTION

An object of the invention is to provide a locking joint meeting these three requirements simultaneously.

To this end, the invention provides a locking joint wherein a collar made of elastomer and duplicate molded on the locking ring covers the latter on all sides except on its inner toothed surface, the collar comprising, toward the front, at least one elastic lip which is interposed longitudinally between the locking ring and the rear surface of a rigid stop ring enclosing the smooth end of the pipe.

In accordance with other features:

the collar ends, at the rear, in a cylindrical sleeve connected to the elastic lip by a connective sheathing constituting a covering on the radially-external surface of the locking ring, the elastic lip and the rear cylindrical sleeve are internally toothed in contact with the smooth pipe end and tightly clamp the latter, the collar comprises, toward the front, two diverging lips, a radial sheathing, which projects upwardly on the elastic lip, extends the lip in an external radial direction, the elastic lip is a retaining ring made of elastomer and incorporates axial cells, and the rear cylindrical sleeve of the collar forms a gripping protuberance projecting axially beyond the counter-flange.

When the joint incorporates an axial-compression gasket, axial compression being generated by the counter-flange, the device advantageously comprises, first, a compression ring having a front surface supported on the gasket and a rear surface, this ring constituting the stop ring; and second, a counter-flange fitted with the attachment means and having a front thrust face which works in conjunction with the rear face of the compression ring and an inner face for position-retention of the locking ring, which converges toward the rear.

When the joint incorporates a radial compression gasket, radial compression being generated by the insertion of the smooth pipe end in the socket, the stop ring is advantageously a ringbrace sandwiched between the radial outer face of the socket and the front face of the counter-flange.

DETAILED DESCRIPTION OF THE PREFERRED EMBODIMENTS

Figure 1:
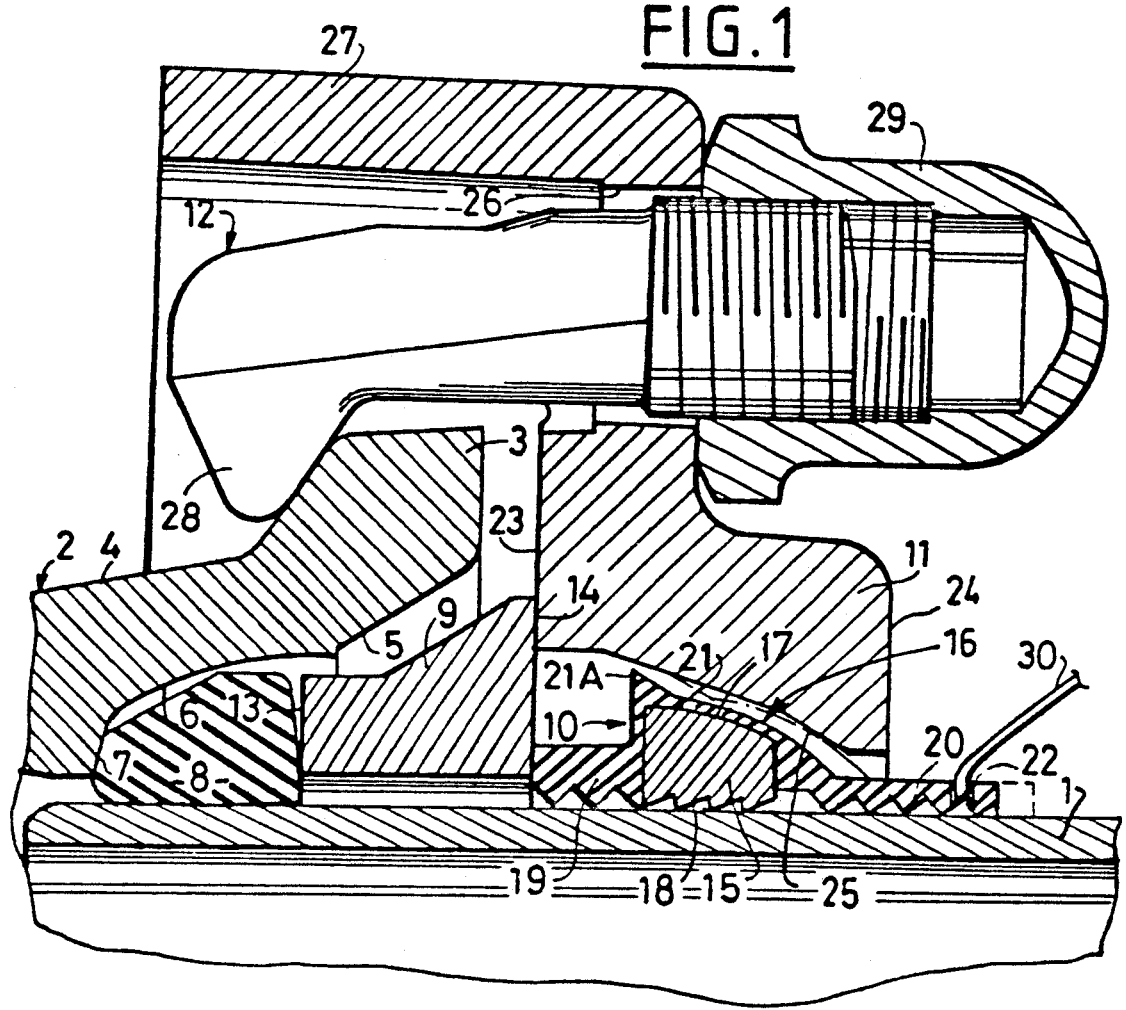
FIG. 1 is a half-view in axial cross-section of a mechanical locked joint in accordance with the invention, during mounting.

FIG. 1 illustrates a locked joint between the smooth or male end 1 of a first tubular element and the socket or female end 2 of a second tubular element. The two tubular elements can, for example, be two successive identical pipes of a pipe system, in particular pipes made of ductile cast iron. For purposes of description, it will be assumed that the two tubular elements have a common horizontal axis.

The smooth end 1 is externally cylindrical, while the socket 2 has, externally and beginning at its point of entry, a radially-projecting collar 3, then a converging surface 4. Internally, the socket has a tapered entry surface 5 followed by a recess 6 whose surface is convergent and ends in a front end face 7, which is nearly radial.

The joint assembly comprises an axial compression gasket 8, a closed compression ring 9, a locking device 10, a counter-flange 11, and a series of fastening bolts 12.

The gasket 8 is made of an elastomer. When the gasket is attached to the male end and loosely abuts the surface 7 of the socket, a free space may remain between its peripheral surface and the recess 6, as seen in FIG. 1.

The ring 9, whose inner diameter is greater than the outer diameter of the smooth pipe end, can penetrate into the socket with appreciable radial play, and has a radial front face 13 (i.e., facing the bottom of the socket) and a radial rear face 14.

The locking device 10 is a composite, duplicate-molded part composed of a series of metal inserts 15 which together form a locking ring and which are embedded and joined together adhesively in a collar 16 made of elastomer. In a variant, the inserts 15 could be replaced by a continuous slotted ring; however, the multiple-insert arrangement is preferable, since it is better adapted to the diverse peripheral pipe configurations.

Each insert 15 is made of a block having a curvilinear trapezoidal section, a large radial front face, a smaller radial rear face, a radially-external convex face 17 converging rearwardly, and a radially-internal face, either flat or cylindrical, but fitted with a series of teeth 18 for gripping the smooth pipe end.

The collar 16 comprises a front cylindrical part forming an internally-toothed elastic lip 19, a rear cylindrical sleeve 20, also internally-toothed, and a connective sheathing 21 which covers the faces 17 of the inserts.

The rear sleeve 20 has a radial hole 22 axially outward from each insert and in proximity to its free end, and, to the outside of the counter-flange, it can be limited to a series of axial tongues positioned at these points. The collar 16 encloses the inserts 15 on all sides, except on their internal toothed faces. The cylindrical parts 19 and 20, which are duplicate molded on the front and rear radial faces, respectively, of the inserts, thus make it possible to hold the inserts in the locking device 10, in particular in the event of a localized bonding defect.

The counter-flange 11 is an annular body delimited by two radial front and rear faces 23, 24, and by a radially-internal surface 25 which converges rearwardly and is proximate the surface 17 of the inserts. The body is extended outwardly by a radial sheathing in which a series of axial bores 26 are cut, and the sheathing is fitted with a peripheral protective edge 27 extending frontwardly.

In describing the assembly of the joint, it will be assumed that the configuration, termed the "maximum play" arrangement, is as illustrated in FIG. 1, in which, given the foundry tolerances, the male diameters are minimal, the female diameters are maximal, and the axial dimensions are maximal for the female components and minimal for the male components.

The parts or components 11, 10, 9, and 8 are strung successively on the smooth pipe end, the gasket being placed on last, at the end of the pipe, and the other parts being freely shifted to the rear. The gasket and the locking device lightly enclose the smooth pipe end.

The smooth pipe end is then inserted into the socket. The gasket abuts the face 7 of the socket, and then slides inwardly until the pipe 1 has reached the desired axial position.

Next, the ring 9 is drawn against the gasket, the locking device 10 is pushed forward until its lip 19 abuts against the ring 9, a movement which is also easily accomplished, since the device is free of any radial compression, and the counter-flange is moved until its face 23 comes into contact against the face 14 of the ring 9.

Next, the bolts 12, which comprise at their front end eccentric nose-pieces 28, are inserted in the holes 26, and the counter-flange is tightened toward the front by screwing the nuts 29 on each bolt, the nose-pieces 28 being supported on the collar 3 of the socket and the nuts 29, on the rear face of the counter-flange sheathing. This clamping action, due to the ring 9, compresses the gasket 8 axially, thus providing the fluid-tightness of the joint.

Because of the maximum play, the counter-flange does not, at this stage, enter into contact with the locking device 10. To produce this contact, the locking device is pulled rearwardly until it contacts the counter-flange, as indicated in dot-and-dash lines in FIG. 1, by means of a rod(s) 30 inserted in the holes 22, which are placed on the outside and to the rear of the counter-flange.

In a variant, the lip 19 can be made sufficiently long to provide that the inner surface 25 of the counter-flange comes into contact with the locking device 10 before its face 23 reaches the face 14 of the ring 9. In this case, the clamping of the bolts produces, moreover, the radial compression of the inserts 15 on the pipe end, and the rear sleeve 20 of the device 10 no longer must extend beyond the counter-flange.

In the reverse situation termed "minimal play", after having inserted the pipe end into the socket, the gasket is inserted and manually prestressed in the recess 6, for example by using a hammer, an operation that is easily accomplished since the entry to the socket is completely open. When the counter-flange is thereafter moved forward, it abuts the sheathing 21 of the locking device 10, but axial play remains between faces 14 and 23. The nuts 29 are then screwed on.

The lip 19 then has sufficient stiffness to ensure that the inserts 15 are pressed against the inner surface 25 of the counter-flange, yet it is sufficiently pliable to allow the forward motion of the counter-flange until it comes into contact with the ring 9, without substantially compressing the gasket 8, this movement of the counter-flange toward the ring 9 being made possible by the fact that the elastomer material volume of the lip 19 is sufficiently small in relation to the volume of its expansion chamber.

Thus, tightening the bolts causes, as a first occurrence, the faces 14 and 23 to come into mutual contact, then, as a second occurrence, the axial compression of the gasket, thereby ensuring the fluid-tightness of the joint.

When the pipe system is pressurized, the pipe end 1 moves backward by a certain distance x in relation to the socket, drawing with it in this movement the inserts, which push the counter-flange backward. However, the counter-flange can move backward only very slightly, such movement being restricted by its rigidity and by the bolts 12. This backward movement y of the counter-flange in relation to the socket is generally much smaller than x, e.g., approximately x/10. Consequently, the ring 9 can move backward only by distance y, so that the compression of the gasket, and thus, the fluid-tightness of the joint, is effectively maintained.

It should be noted that the interior teeth of lip 19 and sleeve 20 of the locking device improve water-tightness around the inserts 15, and thus, the protection they offer against corrosion, by creating fluid-tight baffles. The sheathing 21 and a front radially-projecting heel piece 21A of the sheathing also contribute to this protection. The entirety of the elastomer structure 19, 20, 21, and 21A thus ensures fluid-tightness against external agents and restricts the areas of contact between the inserts and the metal faces on which they are supported.

Figure 2:
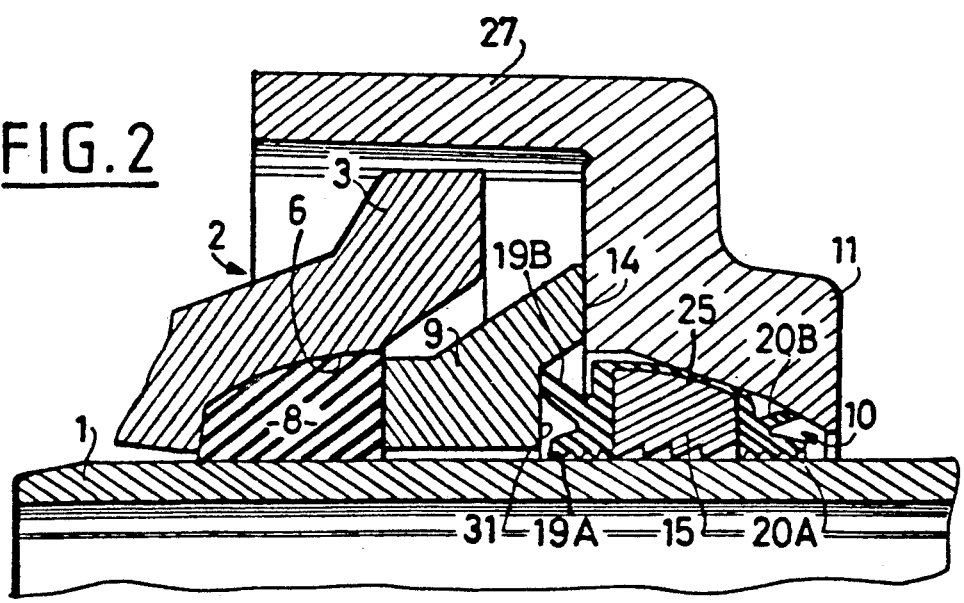
FIGS. 2 and 3 are analogous views of two variants, in the mounted position.
Figure 3:
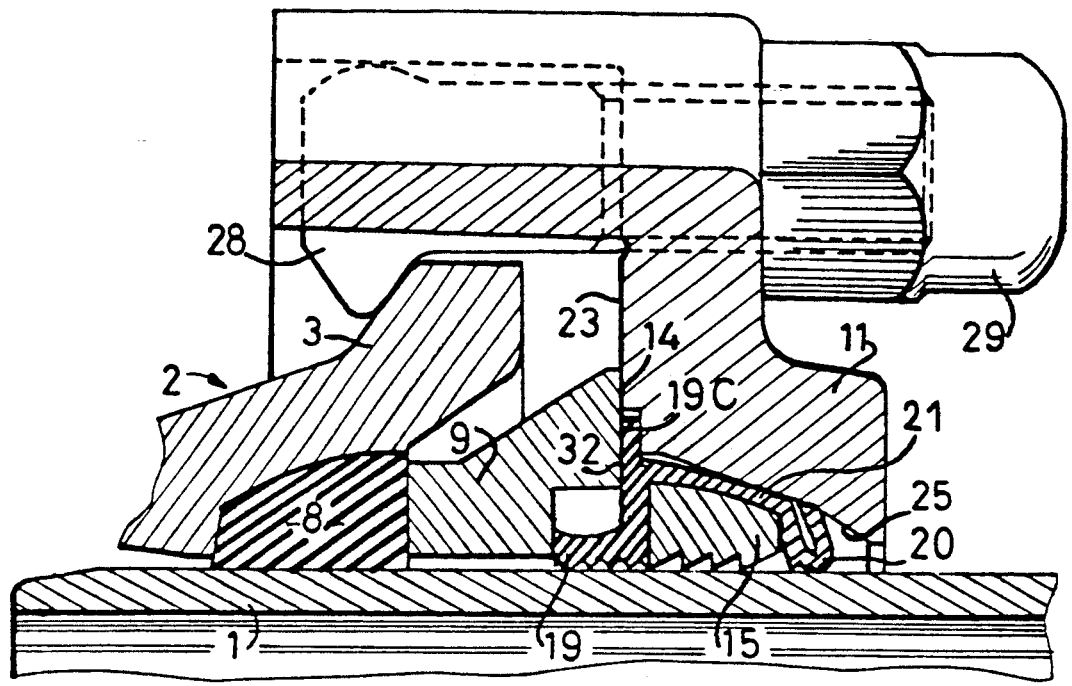

To strengthen the corrosion-protection of the inserts 15, one or the other of the variants illustrated in FIGS. 2 and 3 can be implemented. The variant shown in FIG. 2 differs from the joint in FIG. 1 only by virtue of the following points: the front lip 19 of the locking device penetrates into an annular recess 31 in the rear face of the ring 9 and comprises two diverging lips, i.e., one interior lip 19A pressed on the smooth end, and an exterior lip 19B, which is elastically pressed against the bottom of the recess. The rear sleeve 20 of the locking device is enclosed in its entirety inside the counter-flange and also has two diverging lips, i.e., an interior lip 20A pressed on the pipe end and an exterior lip 20B elastically supported on the interior surface 25 of the counter-flange.

The variant illustrated in FIG. 3 differs from the joint in FIG. 1 solely by virtue of the following points: the face 23 of the counter-flange has, on its interior edge, an annular spot face 2 in which a radial sheathing 19C projecting upwardly on the elastic lip 19 of the locking device is compressed, and the lip 19 is compressed axially against the bottom of an annular recess provided in the ring 9. Moreover, the rear sleeve 20 of the locking device, which is enclosed in its entirety in the counter-flange, has a U-shaped configuration forming a lip which presses elastically against the interior surface 25 of the counter-flange.

Figure 4:
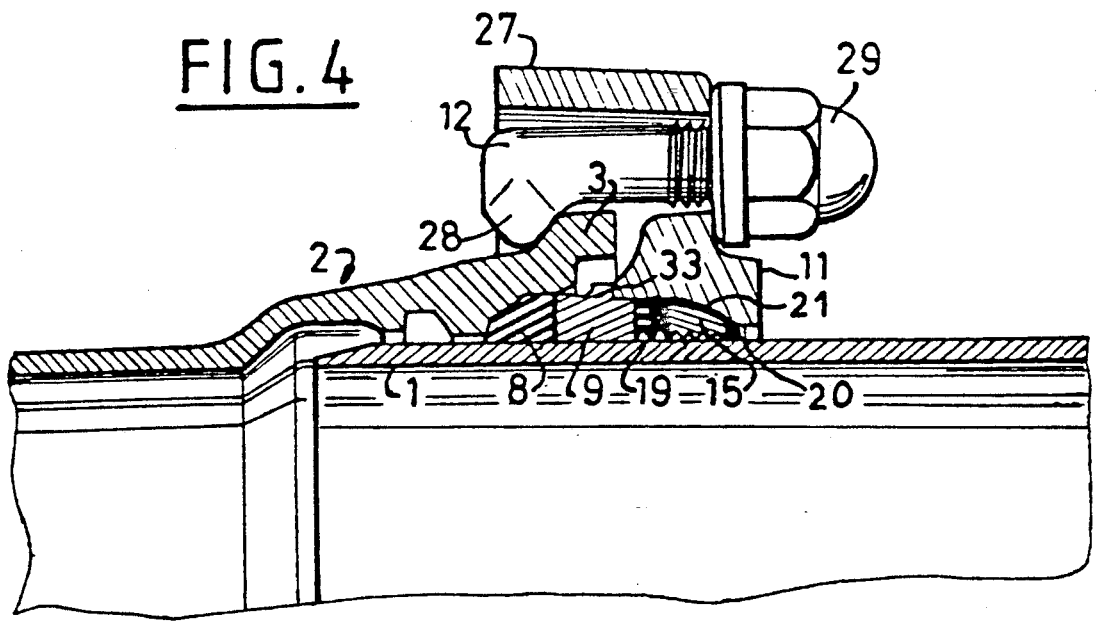
FIG. 4 is a similar view of another embodiment of a mechanical locked joint according to the invention, also in the mounted position.

The variant illustrated in FIG. 4 differs from the joint in FIG. 1 by virtue of the following points: the lip 19 of the locking device is composed of a circular retaining ring incorporating axial cells, the retaining ring having, by virtue of its honeycomb structure, considerable axial flexibility. Furthermore, the ring 9 has a rectangular section, and, at the midpoint of its length, an exterior radially projecting collar 33. Its front part can slide in the rear cylindrical part of the recess 6 in the socket, and its rear part houses, in a sliding configuration, the front part, also cylindrical, of the interior surface 25 of the counter-flange, which is supported on the collar 33, this arrangement thus making it possible to center the ring 9 in relation to the retaining ring and the gasket.

From the foregoing description, it emerges that, in all of the embodiments of the mechanical joints according to the invention, the following advantages are simultaneously obtained:

(1) no stress resulting from fitting the pipe end in the socket;

(2) ease of installation and disassembly, because the counter-flange device is independent of the locking device 10, and ease of access to the gasket in order to prestress it manually before fastening the counter-flange, when that is necessary;

(3) fluid-tightness maintained between the pipe end and the socket, despite the backward movement of the inserts when the pipe system is pressurized, because of the contact between the rigid stop ring and the counter-flange, such contact being produced for a wide range of diametrical tolerances on the assembled pipes and occurring because of the low volume of elastomer in the lip 19 in relation to the surrounding expansion chamber;

(4) the backward movement of the pipe end is kept at a very low value because of the fact that, after the joint is mounted and prior to pressurization of the pipe system, the pressing of the inserts 15 against the surface 25 of the counter-flange, and thus, the absence of axial play at these points, is assured. This is true for large diametral tolerances on the assembled pipes; and (5) anti-corrosion protection, and thus, durability, of the area of contact between the inserts and the metal parts which enclose them, because of the fluid-tightness produced by the elastomer collar 16 and, more especially, by the baffles on its front and rear parts.

Figure 5:
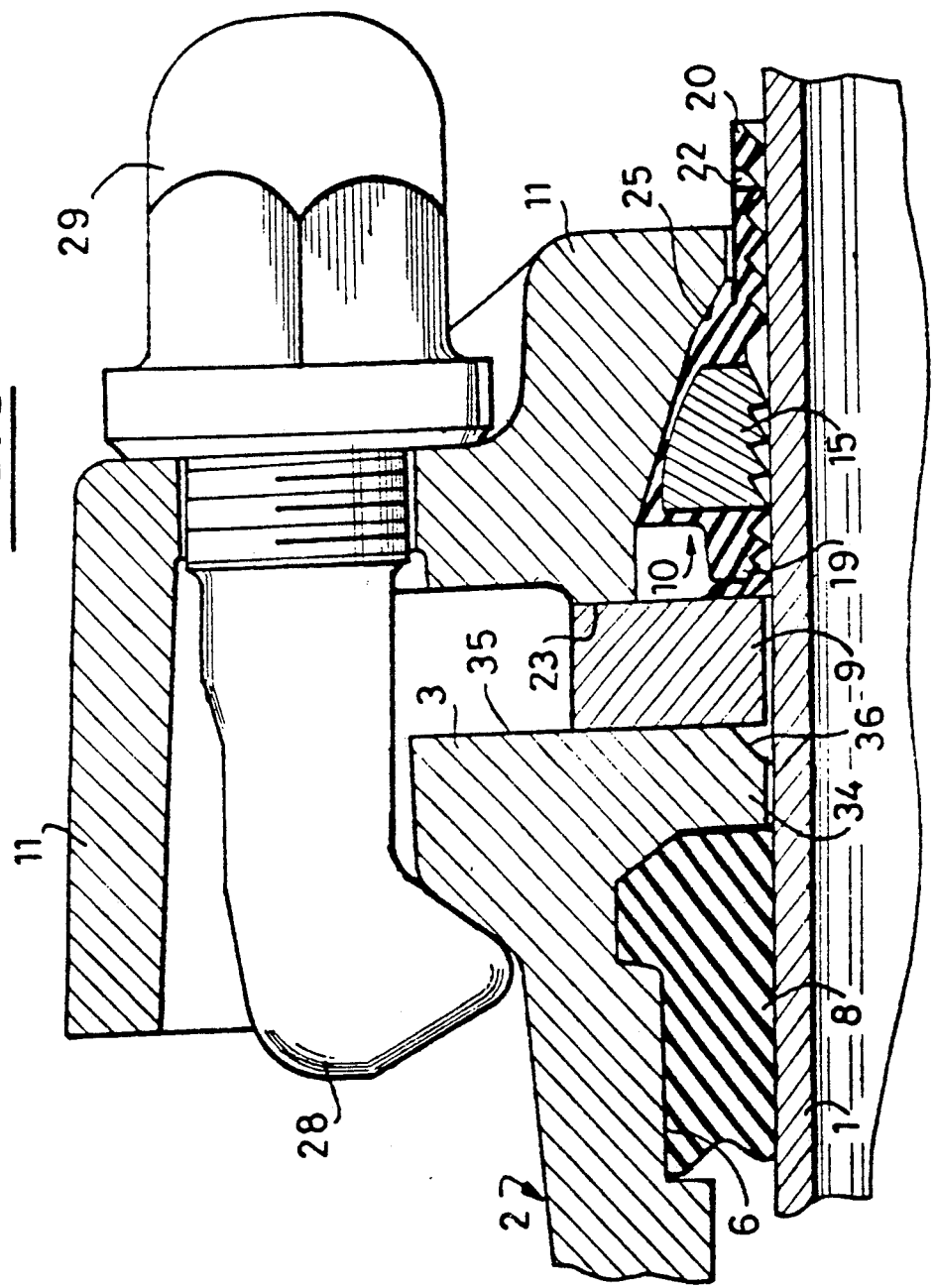
FIG. 5 is a similar view of an automatic locked joint according to the invention.

FIG. 5 illustrates the application of the invention to an automatic joint, in which the recess 6 in the socket 2 comprises an entry collar 34 which is an inward radial extension of the collar 3 and which delimits, in conjunction with the latter, a flat end face 35 of the socket. The gasket 8 is compressed radially in the recess 6 simply by virtue of the insertion of the pipe end 1 into the socket. In this case, the locking device 10 is the same as that in FIG. 1, and the variants in FIGS. 2 to 4 can also be used. On the other hand, the ring 9 is a ring-brace having a rectangular section and sandwiched between the faces 35 of the socket and 23 of the counter-flange. In this case, the ring 9 serves mainly to supply a support for the elastic lip 19 of the locking device 10, while the entry collar 34 has an interior chamfer 36 to facilitate the insertion of the pipe end. Consequently, in a variant, the ring 9 can be eliminated in certain cases, the counter-flange 11 and the lip 19 then being supported directly on the end face of the socket.

In such an arrangement, it is again ensured that the inserts 15 will be pressed without play on the surface 25 of the counter-flange before the pipe system is pressurized, and that, consequently, the backward movement of the pipe end will be minimal. Moreover, as in the preceding cases, mounting and disassembly of the joint are very convenient.

We claim:

1. A locking joint for joining a smooth end (1) of a first tubular element and a socket (2) of a second tubular element, said joint comprising: an annular sealing gasket (8) housed in the socket, an annular locking ring (15) incorporating interior teeth (18) surrounding the smooth end, an annular counter-flange (11) fitted with means (12) for attachment to the socket and configured to implement position-retention of the locking ring opposing any backward movement thereof in a direction away from the smooth end of the first tubular element, a rigid annular stop ring (9) which encloses the smooth end and abuts the gasket, and an annular collar (16) made of elastomer and duplicate molded on the locking ring, enclosing the locking ring on all sides except on an interior toothed face thereof, said collar being disposed within the counter-flange, between the counter-flange and the smooth end, and comprising, on a front end facing the socket, at least one annular elastic lip (19) disposed longitudinally between the locking ring and a rear face (14) of the rigid annular stop ring.

2. A locking joint according to claim 1, wherein said collar terminates, at a rear end, in a cylindrical sleeve (20) joined to said elastic lip by a connective sheathing (21) covering a radially exterior face (17) of the locking ring.

3. A locking joint according to claim 2, wherein said elastic lip and said rear cylindrical sleeve are toothed internally in contact with the smooth end and clamp the latter elastically.

4. A locking joint according to claim 3, wherein said collar comprises, on said front end, two diverging elastic lips (19A, 19B).

5. A locking joint according to claim 3, wherein said rear cylindrical sleeve (20) forms a gripping protuberance projecting axially beyond said counter-flange (11).

6. A locking joint according to claim 1, wherein a radial sheathing (19C) projects radially from said elastic lip (19), and forms an extension of the lip.

7. A locking joint according to claim 1, wherein said elastic lip (19) is an elastomer retaining ring incorporating axial air cells.

8. A locking joint according to claim 1, wherein the sealing gasket (8) is an axial compression gasket, wherein said stop ring (9) has a front face (13) which abuts the gasket and constitutes a compression ring, and wherein said counter-flange (11) has a front thrust face (23) which engages and works in conjunction with the rear face (14) of the stop ring, and an interior face (25) which converges to the rear and holds the locking ring in position.

9. A locking joint according to claim 1, wherein the sealing gasket (8) is a radial compression gasket, and wherein said stop ring (9) is a ring-brace sandwiched between a radial end face (35) of the socket and a front face (23) of the counter-flange.

* * * * *